H. P. TOWNSEND.
METAL WORKING MACHINE.
APPLICATION FILED MAY 29, 1915.

1,300,051.

Patented Apr. 8, 1919.
2 SHEETS—SHEET 1.

WITNESSES:

INVENTOR.

BY

ATTORNEY.

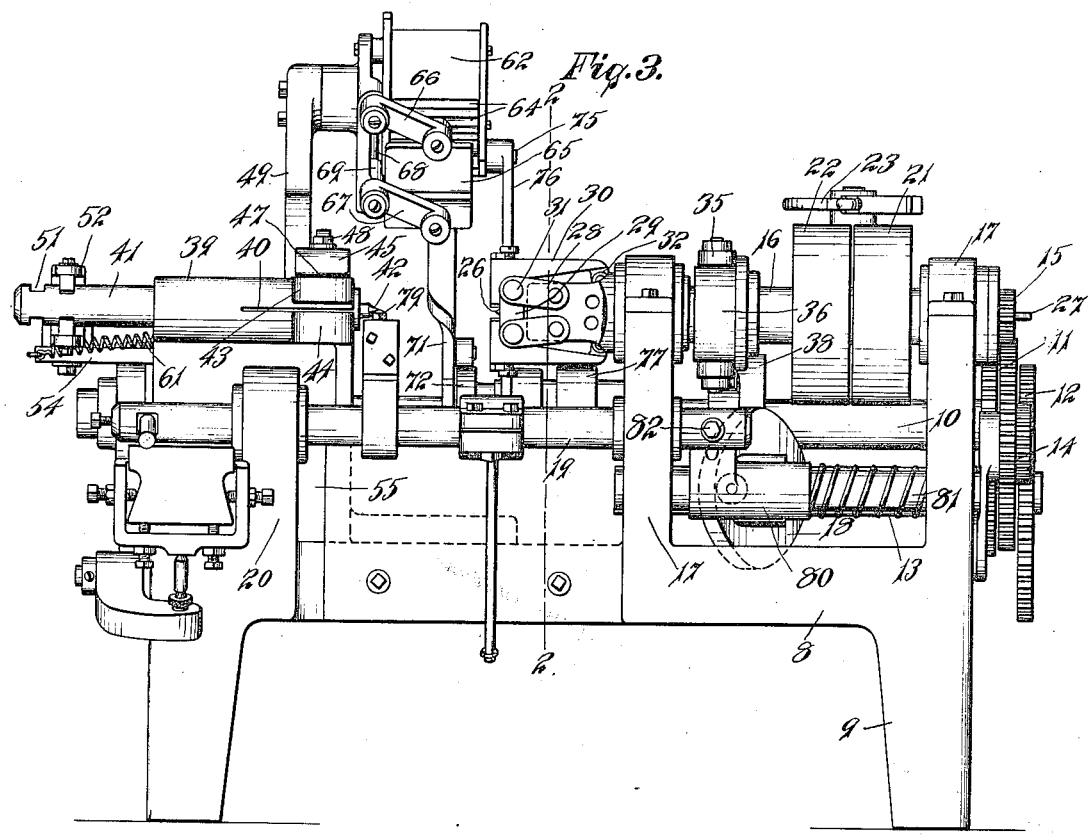
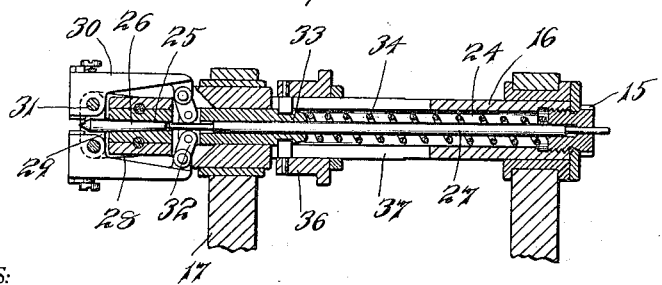

UNITED STATES PATENT OFFICE.

HARRY P. TOWNSEND, OF HARTFORD, CONNECTICUT, ASSIGNOR TO THE H. P. TOWNSEND MANUFACTURING COMPANY, OF HARTFORD, CONNECTICUT, A CORPORATION OF CONNECTICUT.

METAL-WORKING MACHINE.

1,300,051.  Specification of Letters Patent.  Patented Apr. 8, 1919.

Application filed May 29, 1915. Serial No. 31,283.

*To all whom it may concern:*

Be it known that I, HARRY P. TOWNSEND, a citizen of the United States, and a resident of Hartford, in the county of Hartford and State of Connecticut, have invented a new and Improved Metal-Working Machine, of which the following is a specification.

My invention relates more especially to that class of machines for producing various articles, especially from blanks, by cutting or similar operations, and an object of my invention, among others, is to provide a machine of this class in which the blanks are supported upon centers during the turning or other cutting operations.

One form of machine embodying my invention and in the construction and use of which the objects herein set out, as well as others may be attained is illustrated in the accompanying drawings, in which—

Fig. 3 is a view in front elevation of the machine.

Fig. 4 is a detail view in longitudinal section through the chuck spindle.

Figure 1:
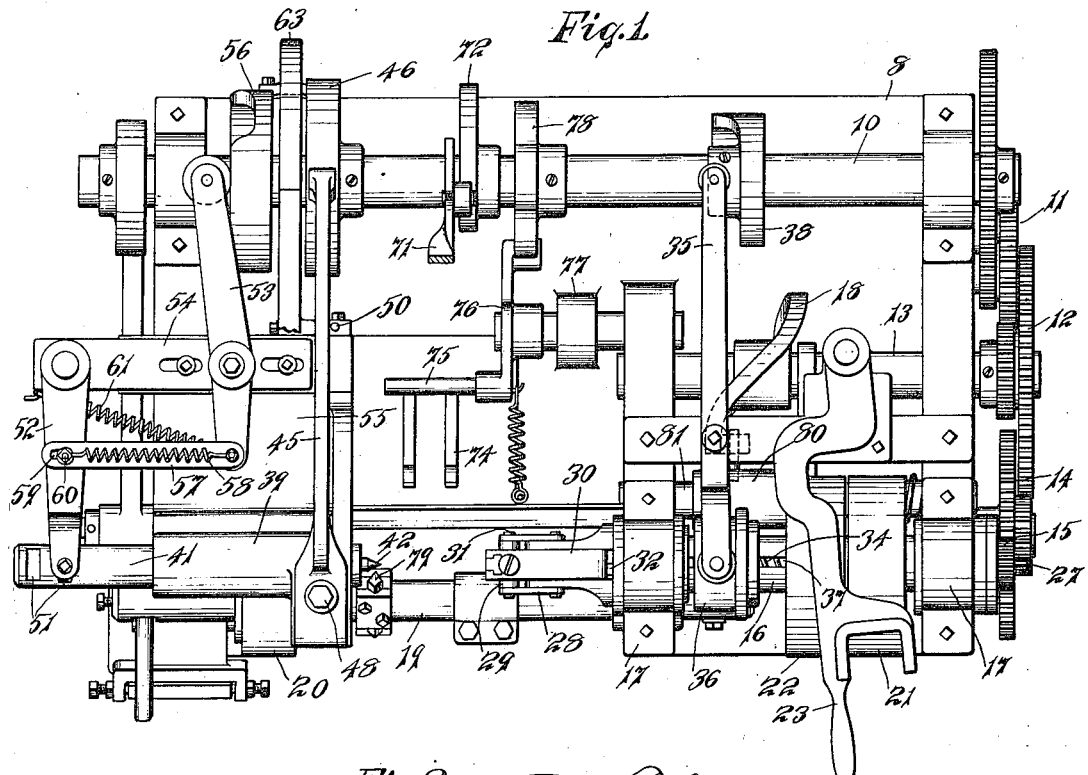
Figure 1 is a plan view of a machine embodying my invention, a portion of the feed mechanism being removed.
Figure 2:
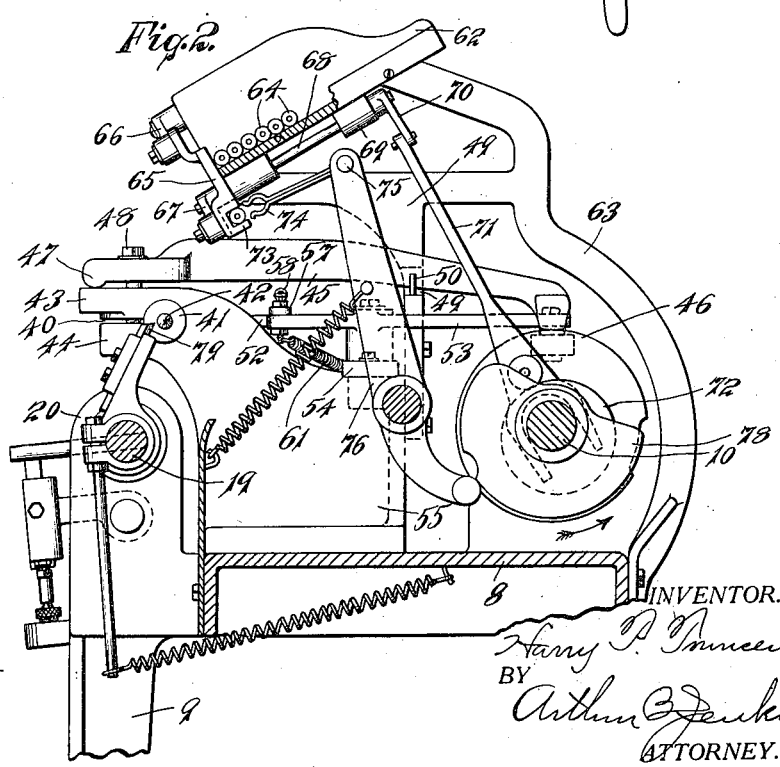
Fig. 2 is a view in cross section through the machine on plane denoted by dotted line 2—2 of Fig. 3, the side of the receiver being broken away.

In the accompanying drawings the numeral 8 indicates the bed of my improved machine that may be supported by legs 9, this bed containing the operative parts of the machine. A cam shaft 10 is supported in bearings near the back of this bed and is rotated by a train of gears 11 connected with a gear 12 upon a tool bar cam shaft 13 mounted in the frame upon the bed, said shaft being driven as by means of a train of gears 14 including a pinion 15 secured to a chuck spindle 16 mounted in supports 17 rising from the bed of the machine. A tool bar operating cam 18, secured to the tool bar cam shaft 13 is positioned to operate a spring pressed tool bar actuating slide 80, mounted on a guide bar 81, and having a slot to receive a tool bar actuating pin 82 projecting from a tool bar 19 mounted for reciprocating movement in bearings, one in one of the supports 17 and the other in a tool bar support 20. Fast and loose pulleys 21—22 are mounted upon the spindle 16 to receive a belt from any suitable source of power and that may be shifted from one pulley to the other as by means of the belt shifter 23. All of the parts above described are of general and well known construction and except in connection with other members form no part of my present invention, and further and detailed description is therefore omitted herein.

The machine herein illustrated and described and embodying my invention comprises means for supporting pieces of metal upon a center or centers while being turned, the mechanism including means for feeding the piece blanks into position adjacent to the turning tool, for securing and holding the blanks in this position, and for rotating them while being turned. To effect this purpose the spindle 16 has an axial opening 24 terminating in a chuck center opening 25, the latter containing a chuck center 26. A plunger 27 extends through the spindle and projects slightly at its outer end and with its inner end in position to engage the chuck center 26. This plunger is loosely supported so that it may be utilized, as by blows on its outer end, as an aid in removing the chuck center. This plunger is located within a spring to be hereinafter described and serves as a means for supporting said spring, and in order that it may efficiently serve this purpose and not work out at the rear end of the spindle it is non-removable. This end of the spindle is preferably flattened upon opposite sides and floating frames are pivotally mounted, one upon each side of said flattened surfaces, each frame including supporting links 28 connected by supporting cross bars 29. Chuck jaws 30 are pivotally supported between these frames upon opposite sides of the axis of the spindle, as herein shown the pivots 31 connecting the supporting links and cross bars also serving as the pivotal supports for said jaws. This construction permits a bodily adjustment of the jaws automatically in a direction across the axis of the spindle and they are therefore termed by me "floating" jaws. Their rear ends are connected by toggles 32 with a chuck jaw plunger 33 mounted for longitudinal reciprocating movement within the spindle and operated in one direction by a spring 34 and in the opposite direction by a chuck jaw operating lever 35 pivotally supported on the machine and having a forked end operatively engaging a chuck jaw operating collar 36 mounted to slide on the spindle and having projections extending through slots 37 into an annular groove in the end of the chuck jaw plunger. The lever 35 is operated in one direction by a chuck jaw operating cam 38 upon the cam shaft 10, the spring 34 causing this end of the lever to rest against the cam, which cam is shaped to operate the lever and permit its movement to cause the chuck jaws to grasp and release blanks at the proper times.

This construction of the "floating" jaws permits them to so adjust their position with respect to a blank held by the center 26 that the blank will be firmly grasped by the jaws even though it is not accurately engaged at its axis by the center, or should there be, for any other reason, more metal of the blank located upon one side than upon the other side of the point engaged by the center.

A tail stock 39 is supported upon the bed with the axis of an opening therethrough in line with the axis of the chuck spindle. This tail stock is provided with a lengthwise slit or slits 40 to enable the metal to yield to reduce the size of the opening to clamp the tail or dead spindle 41 having a dead center 42 secured thereto in any desired position. In the form of construction herein shown a single slit 40 is made from the opening through the tail stock to the front side and extending for a portion of the distance back from the center 42, dividing the tail stock into an upper jaw 43 and a lower jaw 44. A tail spindle clamping lever 45 is constructed to close said jaws together, this lever extending backwardly to engage with and be operated by a tail spindle clamping cam 46. Various arrangements of the lever may be had to accomplish this result, in the construction herein shown the lever having a lip 47 that rests upon the upper jaw 43 and an opening through which a holder 48 extends. This holder, as illustrated, is in the form of a bolt extending loosely through the opening in the lever and through an opening in the jaw 43, said bolt being threaded into the under jaw 44. The head of the bolt forms a fulcrum against which the lever is pressed at suitable intervals by the cam 46, thus forcing the lip 47 into engagement with the upper jaw 43 to move it toward the lower jaw and clamp the tail spindle 41 in place. The lever 15 is guided in its movements between the side of a receiver support 49 and a guide pin 50 projecting from said support.

A tail spindle operating lever has a forked end arranged to engage grooves 51 in the tail spindle, there preferably being a number of sets of these grooves, each set consisting of two grooves one located upon the opposite side of the spindle from the other as shown in Figs. 1 and 3 of the drawings, this for the purpose of adjustably determining the zone of movement of the tail spindle to suit piece blanks of different lengths. This lever may be constructed and operated in various ways. As shown herein it is formed in two sections, a tail spindle section 52 and a cam operated section 53, both pivotally mounted upon a plate 54 adjustably secured to the upper edge of a flange rising from a block 55 constituting a support for the tail stock 39, and as shown herein formed integrally therewith. The section 52 is pivoted at the end opposite its fork and the section 53 is mounted intermediate its ends, one end of the latter being constructed for operation by a tail spindle operating cam 56 and its opposite end being connected by a link 57 with the section 52. The two sections of the lever are yieldingly connected as by a spring 58, in the construction herein shown this connection being steadied as by the link 57 loosely connected with one of said lever sections by a pin and slot connection, preferably at that end connected with the lever section 52 and including a slot 59 in the link to receive a pin 60 on the lever section, a spring 61 secured at one end to a stationary part, as the plate 54, and at the opposite end to the lever section 53 holds the cam engaging end of the latter in contact with the cam 56, this spring, therefore, operating the tail or dead spindle in one direction.

A receptacle 62, as shown herein in the form of a plate arranged in an inclined position and with side parts, is located on a frame at the upper ends of receptacle supports 49—63 in position to supply piece blanks 64 to a reciprocating feed slide 65 pivotally supported by arms 66—67, one of which is pivotally secured to a stud upon said frame and the other of which is secured to a feed slide operating shaft 68 mounted in bearings 69 in said supports and having a crank arm 70 connected by a feed slide operating rod 71 with a feed slide operating cam 72 by means of which the feed slide is operated. This slide has a piece blank rest 73 at each end to receive a piece blank from the receiver, these rests being spaced to permit feed fingers 74 to enter the space between them to remove a blank. These fingers are spring fingers projecting from a feed finger supporting stud 75 extending laterally from one end of a feed finger operating lever 76 that is pivotally mounted in a support 77 rising from the bed of the machine. The end of this lever is extended to engage with a feed finger operating cam 78 secured to the cam shaft 10.

Beginning with the movement of a blank from the receptacle the operation is as follows:

The feed slide 65 being located with the blank rests in position to receive a blank, and a blank having rolled from the receptacle onto said rests, the cam 72, through the connection described, rocks the shaft 68 and swings the arm 67, moving the slide downwardly, the steadying arm 66 also being swung. The cam 78 is shaped and timed in its movements to operate the feed fingers, through the connection hereinbefore described, to pick up a blank from the rest 73, to then move the fingers backwardly from the slide, after which the cam 72 moves the feed slide 65 upwardly from in front of the feed fingers. The cam 78 now operates to move the feed fingers downwardly to position the blank in line between the chuck or live center 26 and the back or dead center 42. After the blank has been thus positioned the tail spindle operating cam 56, that is shaped and timed in its movement to effect the operation, moves the tail spindle 41 and dead center 42, through the connections hereinbefore described, against the end of the piece blank, pushing it between the chuck jaws 30 and against the live or chuck center 26. Just after the blank is thus engaged and held by both of said centers the clamping cam 46, that is shaped and timed in its operation to effect the movement, forces the clamping lever 45, through the connections hereinbefore described, into engagement with the upper end of the tail stock, thus clamping the tail spindle 41 firmly in position to securely hold the blank during turning operations thereon.

After the blank has been engaged by the centers the cam 38, that is properly shaped and timed to effect movement, operates the chuck jaws 30 through the connections hereinbefore described to grasp the blank, the "floating" jaws enabling them to securely grasp the blank in every instance irrespective of any irregularity in its position or shape, and rotate it for action of the cutting tool 79 supported and operated by the tool bar 19. This tool bar operating mechanism is shown herein, but as it forms no part of my present invention a detailed description thereof is omitted.

After the clamping lever 45 has secured the tail spindle the cam 56 releases the tail spindle operating lever that is now free to move under the force of the tail spindle operating spring 61 when the tail or dead spindle is released from the clamp, and the cam 46 is shaped to effect this release at the proper time after the tool has completed its cutting operation upon the blank. The cam 38 is also timed and shaped to effect release of the hold of the chuck jaws upon the blank at about this time so that as the dead spindle 41 moves backwardly the blank will fall from its position.

It will be understood that the cams are shaped and timed to effectually perform their functions at the proper time, and while I have shown and described herein a satisfactory arrangement of mechanism for effecting my purpose, this construction may be departed from to a greater or lesser degree and yet be within the spirit and intent of the invention as defined by the appended claims.

I claim—

1. A rotatably mounted spindle, a center secured within the spindle in axial alinement therewith to receive a piece blank, a spring located within the spindle, a member projecting into the spindle and loosely mounted therein as a means for removing said center, said member being also non-removable from the spindle as a permanent support for said spring to engage the inner end of said center, means for grasping said piece blank, and means for supporting the opposite end of said piece blank.

2. A rotatably mounted spindle, a center secured within the end of the spindle to receive a piece blank, a frame secured to opposite sides of the spindle, chuck jaws pivotally mounted in said frame, means for independently adjusting the position of the chuck jaws laterally of the spindle and by contact with a blank, means for operating the chuck jaws, and means for supporting the opposite end of the piece blank.

3. A rotatably mounted spindle, a center secured within the end of the spindle to receive a piece blank, a frame pivotally secured to the spindle, chuck jaws pivotally supported by said frame, means for independently adjusting the position of the chuck jaws laterally of the spindle and by contact with a blank, means for operating the chuck jaws, and means for supporting the opposite end of the piece blank.

4. A rotatably mounted spindle, a center secured within the end of the spindle to receive a piece blank, a frame including supporting links pivotally secured to the spindle, a cross bar pivotally uniting said links, chuck jaws pivotally secured on the axis of the pivots connecting said links and cross bars, means for operating the chuck jaws, and means for supporting the opposite end of said piece blank.

5. A rotatably mounted spindle, a center secured within the end of the spindle to receive a piece blank, a pair of supporting links pivotally secured to one side of the spindle, a cross bar pivotally connecting the outer ends of said links, chuck jaws pivotally supported on the axis of said pivots uniting the links and cross bar, and means for supporting the opposite end of the piece blank.

6. A rotatably mounted spindle, a center secured to the end of the spindle to receive a piece blank, a pair of supporting links supported at each side of the spindle, a cross bar connecting each of said pairs of links, chuck jaws pivotally secured between the cross bars on opposite sides of the spindle and upon the axis of the cross bar uniting said links and cross bars, means for operating the chuck jaws and means for supporting the opposite end of said piece blank.

7. A rotatably mounted spindle, a center secured within the end of the spindle to receive a piece blank, a frame including a supporting link pivotally attached to the spindle, a cross bar pivotally uniting said links, chuck jaws pivotally mounted on said frame, and means for rotating the chuck jaws.

8. A rotatably mounted spindle, a frame including supporting links secured to the spindle, a cross bar pivotally uniting said links, chuck jaws pivotally secured on the axis of the pivots connecting said links and cross bar to receive a piece blank, means for operating the chuck jaws, and means for supporting the opposite end of said piece blank.

9. A rotatably mounted spindle, a pair of supporting links pivotally secured to one side of the spindle, a cross bar pivotally connecting the outer ends of said links, chuck jaws pivotally supported on the axis of said pivots uniting the links and cross bar to receive a piece blank, and means for supporting the opposite end of the piece blank.

10. A rotatably mounted spindle, a pair of supporting links supported at each side of the spindle, a cross bar connecting each of said pairs of links, chuck jaws pivotally secured between the cross bars on opposite sides of the spindle and upon the axis uniting said links and cross bars to receive a piece blank, means for operating the chuck jaws, and means for supporting the opposite end of said piece blank.

11. A rotatably mounted spindle, a center secured to said spindle to receive a piece blank, means for securing the piece blank to rotate with the spindle, a tail stock having an opening with an expansible wall, a dead center longitudinally movable in said opening in the tail stock, power driven means for moving said dead center, and power driven means for reducing the opening in the tail stock to clamp the dead center in place.

12. A metal working machine including a tail stock having a lengthwise slit, a dead center longitudinally movable in the tail stock, power driven means for moving the dead center, and power driven means for pressing the edges of said slit toward each other to clamp the dead center.

13. A metal working machine including a tail stock having means to clamp a dead center, a dead center longitudinally movable in the tail stock, power driven means for moving the dead center, a clamping lever to clamp the dead center against movement, and power driven means for operating the clamping lever.

14. A rotatably mounted spindle, a center secured to the spindle to receive a piece blank, means for clamping the piece blank to the spindle, a longitudinally movable dead center, a compound lever connected with the dead center to operate it, the members of said lever being yieldingly connected, means for operating said lever, and means for holding the dead center in engagement with the piece blank.

15. A metal working machine including a tail stock having lengthwise slits, a dead center movably mounted in the tail stock, power driven means for operating the dead center, a lever mounted to press with one end upon the tail stock to clamp said dead center, and power driven means for actuating the lever from its opposite end.

16. A metal working machine including a tail stock, a dead center movably mounted in the tail stock, means for clamping said center, means for moving said center and for releasing said moving means before release of the clamp, and means for operating the clamp.

HARRY P. TOWNSEND.

Witnesses:
 ARTHUR B. JENKINS,
 E. F. EATON.